United States Patent [19]

Bonaccorso

[11] Patent Number: 4,605,317

[45] Date of Patent: Aug. 12, 1986

[54] HYDROSTATIC ROLLER BEARING

[76] Inventor: Francesco Bonaccorso, Via G. La Farina, 163, 98100 Messina, Italy

[21] Appl. No.: 552,269

[22] Filed: Nov. 16, 1983

[30] Foreign Application Priority Data

Nov. 24, 1982 [EP] European Pat. Off. ........ 82830287.7

[51] Int. Cl.⁴ .................... F16C 21/00; F16C 33/66
[52] U.S. Cl. ...................... 384/101; 384/107; 384/114; 384/475; 384/569
[58] Field of Search ............... 384/99, 100, 101, 107, 384/114, 475, 567, 569

[56] References Cited

U.S. PATENT DOCUMENTS

| | | | |
|---|---|---|---|
| 1,330,829 | 2/1920 | Wilson | 384/569 |
| 2,983,557 | 5/1961 | Blinder | 384/475 |
| 3,408,123 | 10/1968 | Zwicky | 384/114 X |
| 4,129,344 | 12/1978 | Hormann et al. | 384/569 X |

FOREIGN PATENT DOCUMENTS

1435948  5/1976  United Kingdom ................ 384/101

*Primary Examiner*—Donald Watkins
*Assistant Examiner*—David Werner
*Attorney, Agent, or Firm*—Watson, Cole, Grindle & Watson

[57] ABSTRACT

A bearing for supporting a load by the reaction force of a pressurized fluid, by the reaction force of a plurality of solid or hollow bearing rollers in the absence of the pressurized fluid or by a combined reaction force of the pressurized fluid and the bearing rollers includes a plurality of helicoid pressure reduction ducts leading to a number of chambers delimited by the bearing rollers so as to create a large pressure differential between adjacent chambers. The bearing rollers are disposed between bearing races with an interference fit to impede the passage of the pressurized fluid from one chamber to adjacent chambers.

8 Claims, 12 Drawing Figures

HYDROSTATIC ROLLER BEARING

BACKGROUND OF THE INVENTION

1. Field of the Invention

This invention concerns a track and thrust roller bearing for supporting a load by the reaction of a liquid under pressure, by the reaction of rollers in the absence of a liquid under pressure, or by the combined action of liquid pressure and roller support.

2. Description of the Prior Art

The bearing of the present invention operates on the principle of hydrostatic support, in a manner similar to hydrostatic bearings currently in use, but presents new features that greatly enhance its services and broadly increase its possibilities for utilization. One version or embodiment of the hydrostatic support bearing which utilizes all solid rollers does not differ in theory from the hydrostatic support bearings currently in use which have a number of chambers fed by throttles. The chambers are typically separated by fixed tiles covering a portion of the shaft. The tiles have the function of limiting as much as possible the passage of pressured fluid from one chamber of a higher pressure to an adjacent chamber of a lower pressure via undesired fluid passages. These passages greatly decrease the value of the pressure differential in the different chambers, and therefore the loading capacity of the bearing as well.

SUMMARY OF THE INVENTION

The originality of the instant bearing lies in the removal of the prior art fixed tiles which separate one chamber from the other. Thus, the bearing has a continuous row of rollers, as in a standard roller bearing, where each group of rollers, fed by a corresponding pressure reducing duct, includes a chamber which is formed by all cavities existing between the rollers and the bearing races. The pressure in the individual cavities varies slightly depending upon the position of the cavity with respect to the mouth of the pressure reduction duct, and differs slightly from cavity to cavity because the fluid passes through the openings existing between the rollers and the bearing races, and through the openings existing between the roller headers and the frontal surfaces of the edges of the bearing races. However, a high jump in pressure between one chamber and the adjacent chambers may be obtained by a reduction in pressure taking place in the chamber's supply ducts. The position of the mouth of the pressure reduction ducts may be moved toward the central axis of the bearing with respect to the axes of the rollers.

During operation, each roller is basically subjected to three forces. The first force is centrifugal force, which tends to draw the roller nearer to the bearing race of the external ring. The second force results from the entrainment action of the pressure fluid, which tends to form an opening between one roller and an adjacent one, which in turn tends to draw the rollers apart, forcing them to move towards the external ring. The third force is generated by the static pressure of the fluid which, taking into account the position of the mouth of the ducts, tends to form an opening between the rollers and the bearing race of the internal ring. Therefore, whatever the rotation velocity, the rollers work next to the bearing race of the external ring or race, so that an opening forms between the rollers and the bearing race of the internal ring. However, because of the entrainment action of the fluid, a smaller width opening is formed between the rollers and the bearing race of the external ring.

As regards the passage of fluid between the roller headers provided adjacent each end of each roller and the frontal surfaces of the inner edges of the outer bearing race, it has been found that openings formed between the two headers of each roller are equal in width and will differ in width only at slow rotation speeds. Therefore, a standard roller bearing, modified in accordance with the invention may function as a hydrostatic support bearing. The invention replaces the prior art tiles separating adjacent chambers with an equal number of rollers. The basic advantage of such a substitution is seen wherever the incoming fluid pressure is lacking or has been lowered, as the bearing will in such case function as a standard roller bearing, without the danger of operation with a mixed friction or worse, dry friction, with the consequent possibility of a seizure. The rollers will operate with efficient lubrication along and on the races and headers.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein:

FIG. 1 is a sectional view of the bearing taken along line 1—1 of FIG. 1a;

FIG. 8 is an axial end view of a hollow roller.

DETAILED DESCRIPTION OF THE PREFERRED EMBODIMENTS

The apparatus developed in accordance with the present invention will now be described in conjunction with the accompanying figures and more particularly with reference to FIGS. 1 and 1a within which a standard roller bearing has been modified as explained below. Rings $B_1$ and $B_2$ correspond to the rings or races of a standard roller bearing between which rollers are disposed. The edges of a standard roller bearing are eliminated and replaced by two collars or flanges $C_a$ and $C_b$ which are provided on central ring $B_2$ so as to completely cover the roller bearing header.

The internal diameter of collars $C_a$ and $C_b$ is dimensioned to establish a predetermined clearance between ring $B_2$ and the outer surface of ring $B_1$. A variable number of helicoid channels are cut on the external surface of ring $B_2$ depending upon the diameter of the bearing, the number of rollers and the type of load applied. For example, 2, 4, 6, 8 or more channels may be provided, but the number of helicoid channels must be equal to or less than the number of rollers so that there is one helicoid channel provided for every one, to, three or four rollers and so on.

Figure 1:
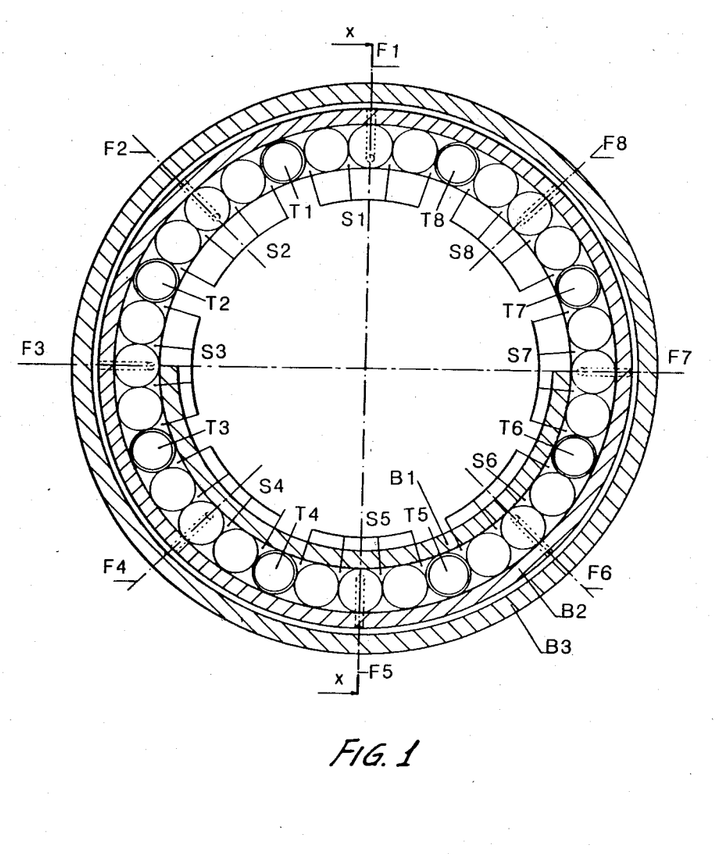
Figure 1A:
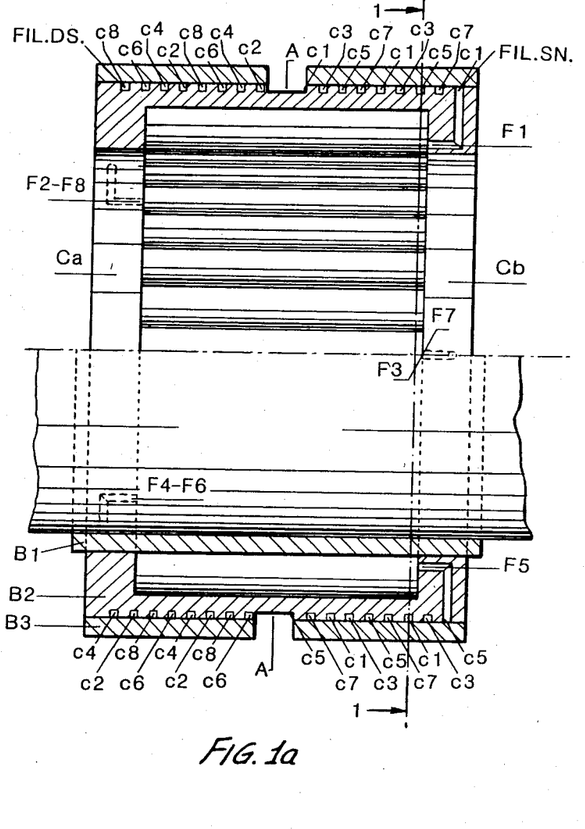
FIG. 1a is a sectional view of the bearing taken along line X—X of FIG. 1.

FIGS. 1 and 1a depict 32 rollers and 8 helicoid channels, so that each helicoid channel feeds one chamber housing four rollers. The helicoid channels are indicated as $C_1$, $C_2$, $C_3$, $C_4$, $C_5$, $C_6$, $C_7$ and $C_8$, respectively. The chambers, each containing a group of four rollers, are indicated as $S_1$, $S_2$, $S_3$, $S_4$, $S_5$, $S_6$, $S_7$ and $S_8$. The eight rollers delimiting the eight chambers are indicated as $T_1$, $T_2$, $T_3$, $T_4$, $T_5$, $T_6$, $T_7$ and $T_8$, respectively. The fluid feeding holes connecting the helicoid channels C with the chambers S are indicated as $F_1$, $F_2$, $F_3$, $F_4$, $F_5$, $F_6$, $F_7$ and $F_8$, respectively.

Keyed on the external surface of ring $B_2$ is a ring $B_3$ which has the function of closing all helicoid channels $C_1$ through $C_8$ and transforming them into an equal number of ducts which are intended to partially decrease the pressure of a fluid running through them. A ringed duct A is cut at the median diameter section of ring $B_3$, and communicates with the outside environment by way of a hole cut into a box intended to house the bearing. As shown in FIG. 1a, there are four helicoid ducts, $C_1$, $C_3$, $C_5$ and $C_7$, cut on the right side of ringed duct A and four helicoid ducts $C_2$, $C_4$, $C_6$ and $C_8$ cut on the left side of ringed duct A. The ducts are staggered at intervals of 360/8=45 degrees between each other and present a resistance to the passage of fluid therethrough as a function of the quantity of maximum load projected on the bearing and by the clearance established between the collars of ring $B_2$ and the outer diameter of ring $B_1$.

As further shown in FIG. 1a, each of the ducts $C_1$ through $C_8$ extends along and forms two helicoid spires or coils. Each duct $C_1$ through $C_8$ begins at ringed duct A and opens into the chambers $S_1$ through $S_8$ underneath or radially inwardly of the ringed duct A. Ducts $C_1$, $C_3$, $C_5$ and $C_7$ lead into corresponding holes $F_1$, $F_3$, $F_5$ and $F_7$ on the right headers of corresponding chambers $S_1$, $S_3$, $S_5$ and $S_7$ and ducts $C_2$, $C_4$, $C_6$ and $C_8$ lead into corresponding holes $F_2$, $F_4$, $F_6$ and $F_8$ on the left headers of corresponding chambers $S_2$, $S_4$, $S_6$ and $S_8$. A half section of ring $B_1$ that has been keyed onto a shaft is visible in FIG. 1 and the entire ring is visible in FIG. 4.

A first variation of the invention shown in FIGS. 1 and 1a requires the replacement of hollow rollers $T_1$, $T_2$, $T_3$, $T_4$, $T_5$, $T_6$, $T_7$ and $T_8$ by an equal number of solid rollers. Each group of rollers served by a helicoid duct is made up of all solid rollers mounted with a suitable clearance. In this bearing variation each chamber S is formed by the entire cavity presented between the rollers and the bearing races, as indicated by chambers $S_1$ through $S_8$ in FIG. 1. In these cavities the fluid is at a slightly varying pressure depending upon the position of the cavity with respect to the mouth of channel F and differs slightly from cavity to cavity. Between each chamber and the two adjacent chambers there is instead a high jump in pressure. In calculating maximums, the pressure in one chamber can be considered standard.

A second variation of the embodiment shown in FIG. 1 requires that each group of solid rollers has one hollow roller T, so that two hollow rollers include between them a certain number of solid rollers to delimit a chamber S. While the solid rollers are of a size that ensures a suitable clearance between the bearing races $B_1$ and $B_2$ as in the first version of the bearing, the hollow rollers T are mounted with a slight interference so that whatever the eccentricity of ring $B_2$ to ring $B_1$, the hollow rollers T ensure there is always an interference fit between the hollow rollers T and the two bearing races $B_1$ and $B_2$. This type of bearing chamber S includes all the cavities between the rollers and the bearing races, as is indicated by chambers $S_1$ through $S_8$ in FIG. 1. In these chambers S the fluid is also at a slightly varying pressure depending upon the position of the cavities with respect to the mouth of channel F and differs slightly from cavity to cavity. However, the jump in pressure between one chamber and the two adjacent chambers is significantly greater than in the first type because the hollow rollers, mounted with a slight interference fit, strongly impede the passage of the fluid from one chamber to the adjacent chambers.

The general operation of the bearing is as follows. Fluid at a suitable pressure is sent to the bearing by a pump that suctions the fluid from a cup through a filter. The fluid flows through a hole formed in a bearing support housing and into ringed duct A. The fluid is then distributed to the pressure reducing ducts C and passes into chambers S through holes F. The fluid then flows outside the bearing through corresponding openings present between collars $C_a$ and $C_b$ and ring $B_1$, and collects in the cup from which it is recycled by the pump.

Figure 2:
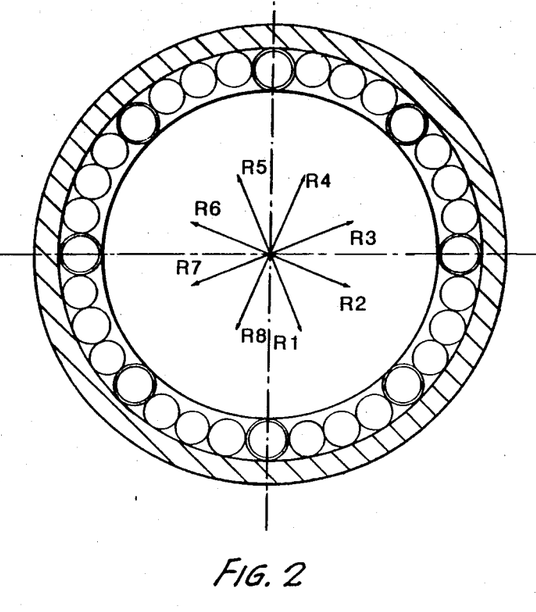
FIG. 2 is a schematic representation of the principle of hydrostatic support in the absence of a bearing load.

If there is no load operating on a shaft supported by the bearing, then the shaft will be coaxial with the bearing as seen in FIG. 2 and thus an annular opening of uniform height identical to the radial clearance will be formed between the collars $C_a$, $C_b$ and the external surface of ring $B_1$. The fluid will then flow to the outside of each chamber S through the corresponding openings that are of an identical flow capacity in each chamber. The flow capacities will also be identical in each pressure reducing duct C and thus the drop in pressure will be identical, with no change in the pressure entering the bearing. In addition, the pressures in each chamber S will be identical. The radial forces R, which act on the shaft by the effect of the fluid pressure in chambers S will be identical, and their resultant will be null. Therefore, there will be no reaction on the bearing.

Figure 2A:
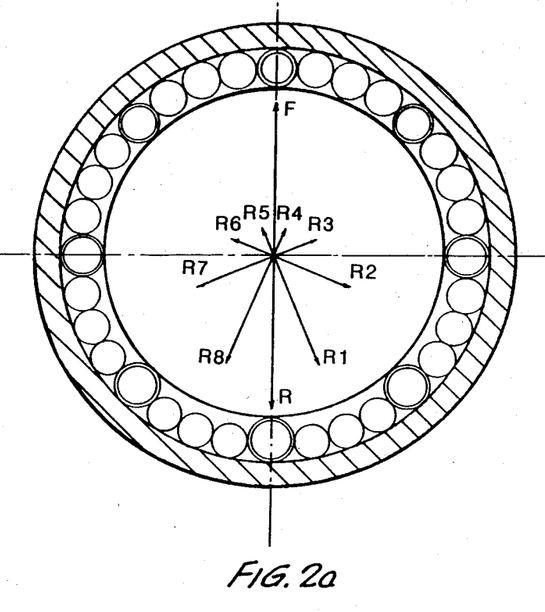
FIG. 2a is a schematic representation of the principle of hydrostatic support in the presence of a bearing load.

If there is a load F on the shaft, then the shaft will assume an eccentric position with respect to the bearing as shown in FIG. 2a. Between collars $C_a$ and $C_b$ and the external surface of ring $B_1$ there will form an opening of variable size, the minimum value of which will be equal to the unloaded radial clearance minus the eccentricity, and the maximum value of which will be equal to the unloaded radial clearance plus the eccentricity. In this case the flow capacity of fluid going toward the outside of the bearing will be at a minimum for the chamber corresponding to the minimum median width opening and will increase in the successive chambers until reaching a maximum in the chamber corresponding to the maximum median width opening.

In the corresponding pressure reducing ducts $C_1$ through $C_8$ feeding chambers S, the capacity will also be different in each duct and will vary from a minimum value to a maximum value. Consequently, the drop in pressure, which in a laminar flow is proportional to the flow capacity, will be different for each duct. Therefore, with the pressure value entering the bearing remaining unchanged, the pressure in chambers S will vary from a minimum value in the chamber corresponding to the maximum median width opening to a maximum value in the chamber corresponding to the minimum median width opening.

The radial forces $R_1$ through $R_8$ acting on the shaft by effect of the fluid pressure in chambers S will be of an intensity proportional to the pressures, and their resultants shown in FIGS. 2 and 2a will be identical and in opposition to the load. The value of the reaction will increase as the pressure of the fluid coming into the bearing, the clearance and the eccentricity increase. Resistance to the passage of the fluid by the reducing ducts depends on their length and on their cross section. These ducts must be of a size that allows an optimal pressure differential in the chambers, which is to correspond to the maximum capacity of the bearing. The system used to calculate optimal capacity forms no part of this invention.

The pressure reducing ducts C will differ in size and thus also provide different resistances to the passage of the fluid if the load presents a quasi-constant direction and verse, varying only in intensity. The reducing ducts C will all be of the same size if the load varies not only in intensity, but in direction as well. Clearly, a limit to the maximum capacity of the bearing will be defined, not only by the dimensions of the bearing, but also by the need to refrain from using excessive values for the incoming fluid pressure and for the clearance, which would translate into excessive values for the capacities, and also by the need to refrain from making the minimum width of the opening too small with respect to the degree of finish and accuracy of the adjacent surfaces, so that a purely fluid friction does not become a mixed friction.

The insertion of hollow rollers results in the most important advantage of the bearing in question. The insertion of a number of hollow rollers equal to the number of reduction channels such as shown by the bearing illustrated in FIG. 1 which provides for a row of 32 rollers, 24 of them solid and 8 with an annular section creates a certain number of chambers, 8 in the bearing shown in FIG. 1, with the pressure in each chamber being quasi-constant. Since the hollow rollers are mounted with a slight interference, the chambers can be considered quasi-hermetic in terms of the passage of fluid from one chamber to the other and therefore the value of the pressure differential between chambers increases greatly, and with it so does the capacity of the bearing as compared to a prior art bearing.

Figure 7:
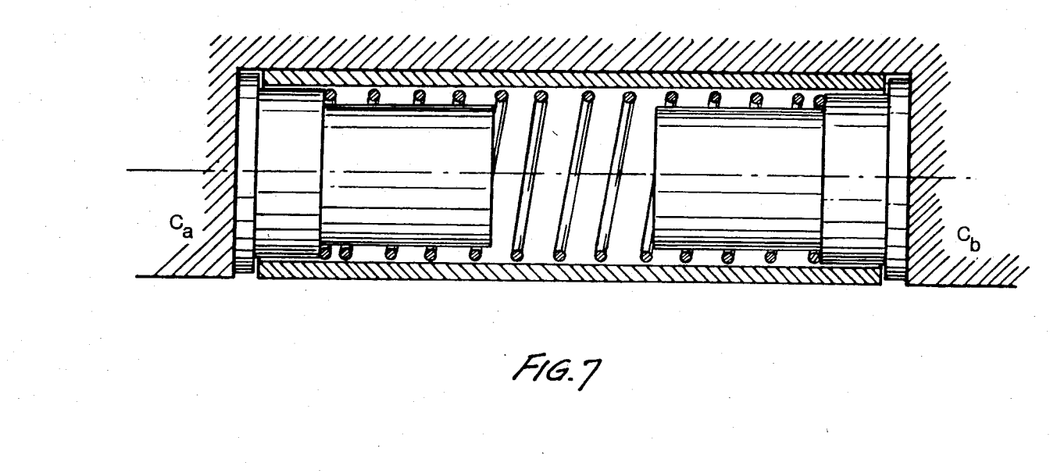
FIG. 7 is a sectional view of a hollow roller.
Figure 7A:
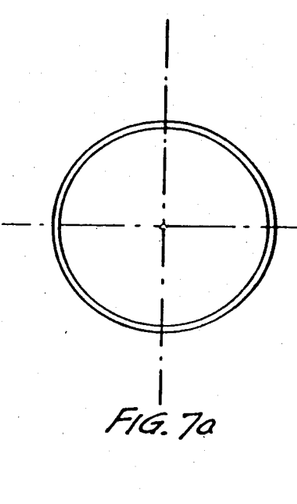

In calculations and experiments performed, the increase in bearing capacity has varied from 30% to 50% more than the capacity of a similar roller bearing operating without the insertion of hollow rollers. In order to increase the water-tightness of the chambers even more, the hollow rollers may be equipped with flat headers and may be biased against the inner surface of the edges of the collars or flanges $C_a$ and $C_b$ by a light spring pressure as is shown in FIG. 7. The resulting seal is a quasi-hermetic seal formed between adjacent chambers.

Thus, the passage of fluid from one chamber to an adjacent chamber at a lower fluid pressure is limited. This passage of fluid is further limited across the roller headers by such spring action to further increase the capacity of the bearing. The interference called for in mounting the hollow rollers is modest and must ensure contact between the hollow rollers and the bearing races, whatever the eccentricity of the bearing operation in accordance with the load. For example, in a bearing requiring a radial clearance of 0.05 mm, with a maximum eccentricity of 0.04 mm, the interference of the hollow rollers, with a centered shaft in the absence of a load, may be 0.05 mm. Therefore, when the bearing is working at maximum eccentricity, the maximum interference will be $0.05+0.04=0.09$ mm and the minimum interference will be $0.05-0.04=0.01$ mm.

In this bearing the hollow rollers are subject to fatigue stresses. Without going into the details of the calculations, it can be stated that the unit values for fatigue stresses are relatively high for small diameter rollers and tend to decrease greatly as the diameter of the rollers increases. In any case, even with small diameter rollers, the fatigue stress is much lower than that permitted by the numerous types of fatigue resistant alloy steels available today.

Two separate versions of the bearing include a bearing for a rotating shaft and a bearing for a fixed shaft.

Figure 3:
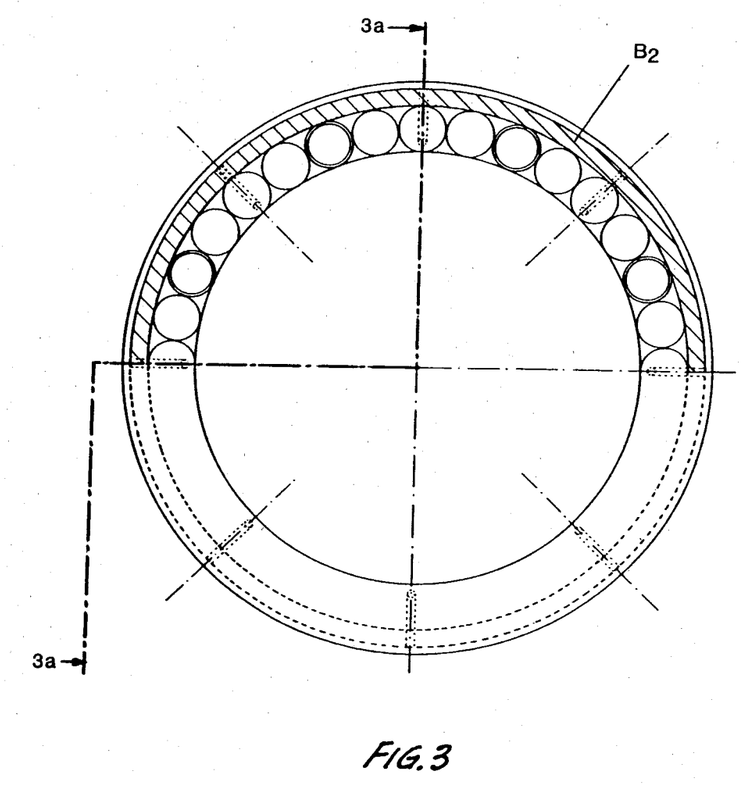
FIG. 3 is a partial sectional view showing the central ring of a rotating shaft and fixed box bearing with external pressure reducing channels and an internal roller bearing race.
Figure 3A:
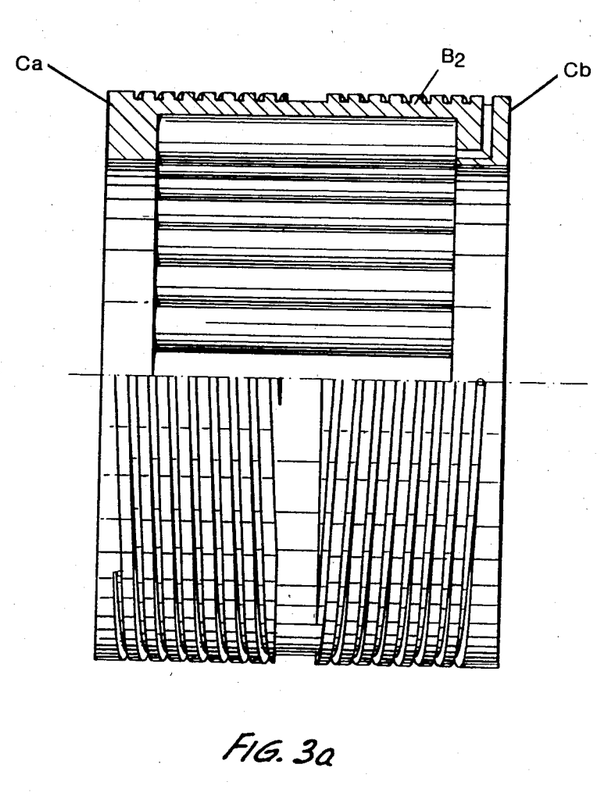
FIG. 3a is a partial sectional view taken along line 3—3 of FIG. 3.
Figure 4:
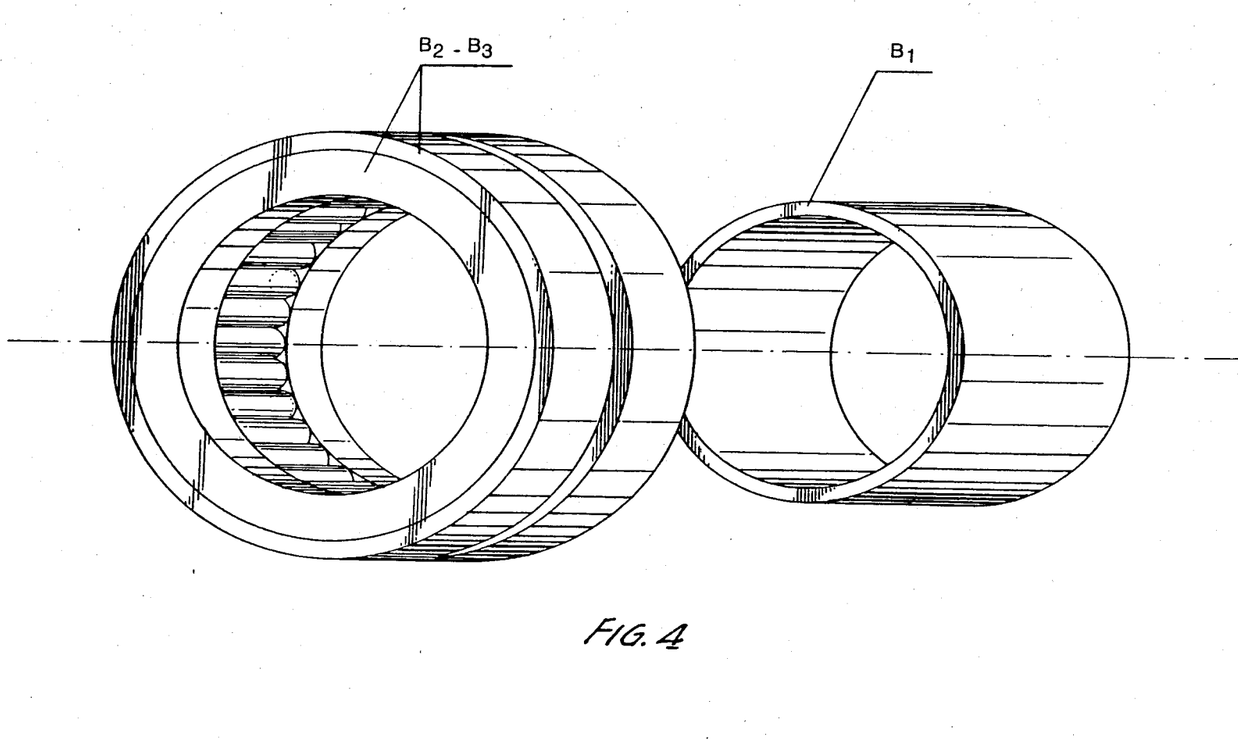
FIG. 4 is a partially exploded perspective view of the complete bearing assemble for a rotating shaft and a fixed box.

A rotating shaft bearing such as shown in FIGS. 3, 3a and 4 includes a ring $B_2$ that bears or forms the bearing race on its inside surface and the helicoid ducts on its outside surface. Keyed on the external surface of ring $B_2$ is ring $B_3$. Ring $B_1$, to be keyed on a shaft, is freely arranged with a pre-established clearance with respect to collars $C_a$ and $C_b$ and with respect to the rolling bodies. Pressurized fluid is fed through a fixed box of the bearing support.

Figure 5:
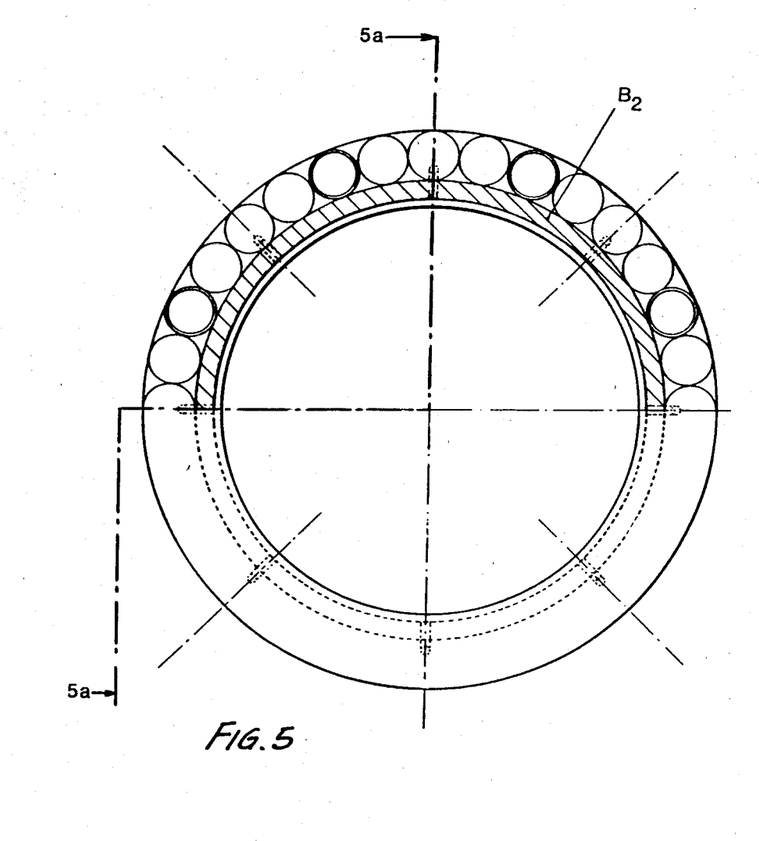
FIG. 5 is a partial sectional view showing the central ring of a rotating box and fixed shaft bearing with internal pressure reducing channels and an external roller bearing race.
Figure 5A:
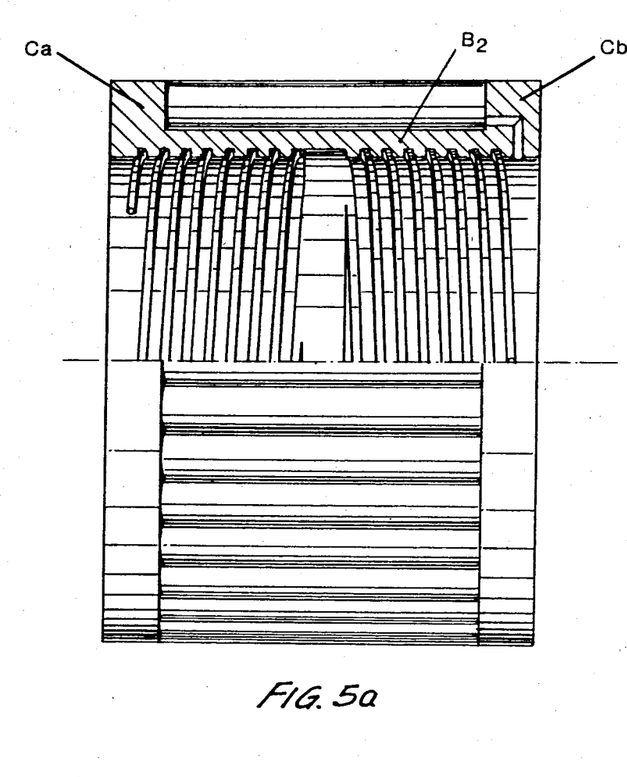
FIG. 5a is a partial sectional view taken along line 5—5 of FIG. 5.
Figure 6:
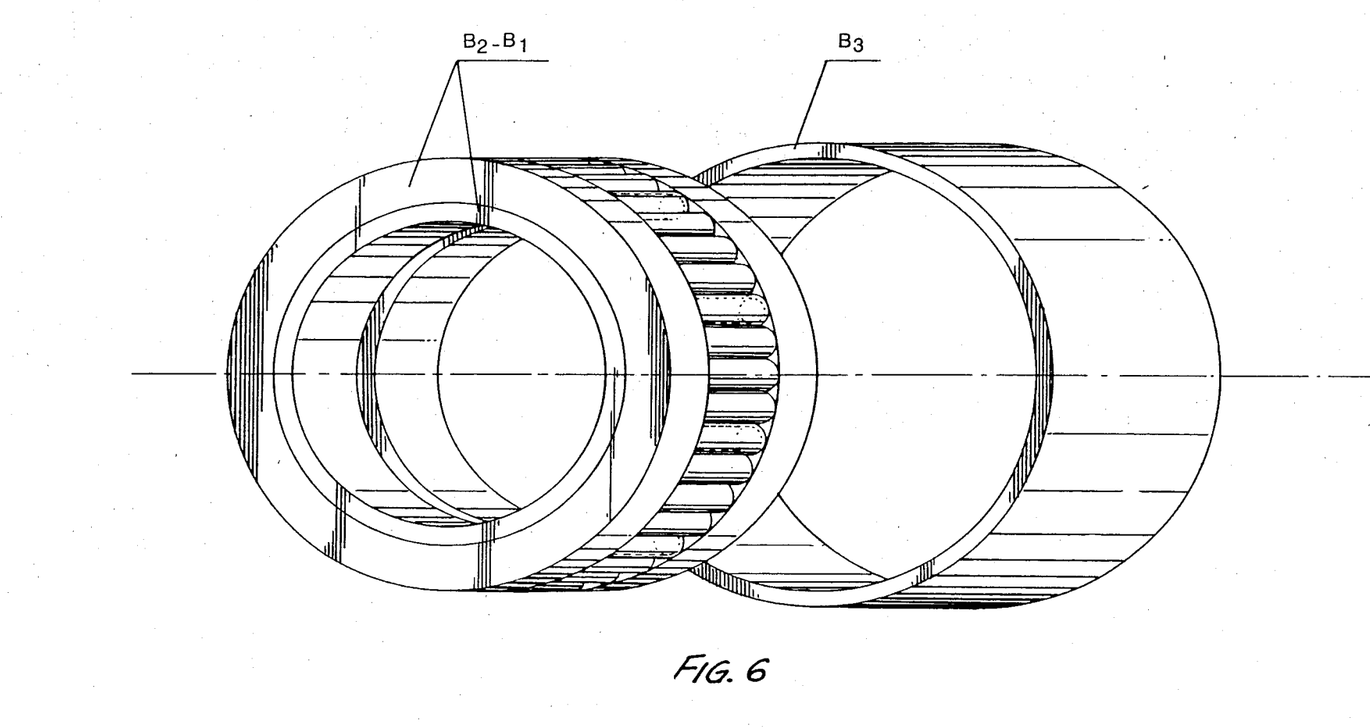
FIG. 6 is a partial exploded view of the complete bearing assembly for a rotating box and a fixed shaft.

A fixed shaft bearing such as shown in FIGS. 5, 5a and 6 includes a ring $B_2$ that bears or forms the bearing race on its outside surface and the helicoid ducts on its inside surface. Keyed on the internal surface of ring $B_2$ is ring $B_1$. Ring $B_3$, to be keyed inside a bearing support box, is freely arranged with a pre-established clearance with respect to collars $C_a$ and $C_b$ and with respect to the rolling bodies. The pressurized fluid is fed through a duct cut on the shaft.

Both types of bearings are constructed according to the standard procedures for roller bearings. As regards the coupling between the keyed rings, the working tolerances are the same as for standard interference fits. As regards the coupling between free rings, the working tolerances are the same as for standard clearance fits. While the fits may be of median tolerance for running bearings, they must be precision fits for highly rigid bearings. The bearings are mounted in the same manner as standard roller bearings.

The bearings in question have a broad range of application. They may be constructed with cylindrical, cone, or barrel rollers, or with any other special profile. They can be used for small, medium, and large loads and may have relatively broad tolerances for running bearings and restricted tolerances for precision bearings. The bearings may be used in three different mannners. The first use is for the complete hydrostatic support of low, medium, and heavy loads and for any velocity, whenever there are no space problems. The second use is with mixed support where the hydrostatic support has the function of more or less lightening the load on the rollers in the case of medium and heavy loads, and whenever there are problems of space. In this respect, it should be noted that well known experiments on the durability of bearings in relation to the specific stress on the rolling bodies and the races have shown that durability is greatly increased even in cases where the specific stress has been decreased only slightly. For example, with a hydrostatic support of 30% of the load, the bearing has a durability that is theoretically 500 times greater.

The durability of the bearing is also increased by the presence of the lubricating fluid. That is, the pressurized fluid may be a lubricating fluid which is rationally distributed over all support surfaces, both static and dynamic. The third use is with mixed support with maximum hydrostatic support and with maximum load on the rollers for very heavy loads and whenever there are problems of space. It is important to emphasize that when there is no fluid pressure, this bearing, unlike the hydrostatic bearings currently in use, can still function with no risk of seizure.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A bearing for supporting a load on a shaft by means of a pressurized fluid and/or by means of a plurality of rollers in the absence of said pressurized fluid;
    said bearing comprising:
    an inner bearing race;
    an outer bearing race;
    a plurality of pressure reduction ducts formed in said outer bearing race for feeding said pressurized fluid therethrough; and wherein said plurality of rollers disposed between said inner bearing race and said outer bearing race are divided into a plurality of groups of at least one roller, each group of said plurality of groups defining a chamber including a plurality of cavities formed between said plurality of rollers and said inner and outer bearing races, each said chamber communicating with and fed by one of said plurality of pressure reduction ducts, such that a loading of said shaft resulting in an eccentric disposition of said shaft within said bearing generates a fluid pressure differential between each said chamber corresponding to a different reaction force opposed to said loading generated within each said chamber.

2. The bearing of claim 1, wherein each group of said plurality of groups of at least one roller comprises a plurality of rollers delimited by first and second hollow end rollers, wherein said first and second hollow end rollers are mounted between said inner bearing race and said outer bearing race with a slight interference fit so as to fluidly seal each said chamber to limit passage of said pressurized fluid from each said chamber to adjacent chambers to increase a loading capacity of said bearing.

3. The bearing of claim 2 wherein said outer bearing race comprises first and second annular flanges and said hollow end rollers each comprise first and second spring biased flat head members each lightly biased against said first and second annular flanges, respectively, so as to substantially form a hermetic seal therebetween for further limiting passage of said pressurized fluid from each said chamber to said adjacent chambers to further increase said loading capacity of said bearing.

4. The bearing of claim 1 wherein said pressurized fluid comprises a lubricating fluid for lubricating said bearing.

5. The bearing of claim 1 wherein said bearing comprises a track roller and said shaft comprises a rotating shaft disposed within a fixed box.

6. The bearing of claim 1 wherein said bearing is mounted within a rotating box and said shaft comprises a fixed shaft.

7. The bearing of claim 1 wherein said bearing comprises a thrust bearing.

8. The bearing of claim 1 wherein said bearing comprises a track and thrust bearing.

* * * * *